United States Patent
Egawa et al.

(10) Patent No.: US 7,586,523 B2
(45) Date of Patent: Sep. 8, 2009

(54) AMPLIFICATION-TYPE CMOS IMAGE SENSOR OF WIDE DYNAMIC RANGE

(75) Inventors: Yoshitaka Egawa, Yokohama (JP); Ryuta Okamoto, Yokohama (JP); Shinji Ohsawa, Yokohama (JP); Hiroshige Goto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 526 days.

(21) Appl. No.: 11/553,233

(22) Filed: Oct. 26, 2006

(65) Prior Publication Data

US 2007/0097240 A1     May 3, 2007

(30) Foreign Application Priority Data

Oct. 28, 2005    (JP)   ............... 2005-315409

(51) Int. Cl.
*H04N 5/235* (2006.01)
*H04N 5/30* (2006.01)

(52) U.S. Cl. .............. 348/229.1; 348/294; 348/308

(58) Field of Classification Search ............. 348/229.1, 348/308, 362
See application file for complete search history.

(56) References Cited

U.S. PATENT DOCUMENTS

| | | | |
|---|---|---|---|
| 5,572,256 | A | 11/1996 | Egawa et al. |
| 6,930,722 | B1 | 8/2005 | Nakamura et al. |
| 6,947,087 | B2 | 9/2005 | Egawa et al. |
| 2001/0008419 | A1* | 7/2001 | Sano et al. ............ 348/222 |
| 2001/0040628 | A1* | 11/2001 | Akahori et al. ........ 348/229 |
| 2003/0095192 | A1* | 5/2003 | Horiuchi ............... 348/222.1 |
| 2005/0231619 | A1 | 10/2005 | Nakamura et al. |
| 2006/0033823 | A1* | 2/2006 | Okamura .............. 348/254 |

(Continued)

FOREIGN PATENT DOCUMENTS

| JP | 9-247694 | 9/1997 |
|---|---|---|
| JP | 2000-23044 | 1/2000 |
| JP | 2001-189893 | 7/2001 |

OTHER PUBLICATIONS

Yadid-Pecht, Orly. "Wide-Dynamic-Range Sensors." Oct. 1999. Optical Engineering 38:1650-1660.*

(Continued)

*Primary Examiner*—David L Ometz
*Assistant Examiner*—Dwight Alex C Tejano
(74) *Attorney, Agent, or Firm*—Oblon, Spivak, McClelland, Maier & Neustadt, P.C.

(57) ABSTRACT

A solid-state image sensor which includes a pixel section, AD converter, line memory, controller and synthesizer is disclosed. The line memory stores a digital signal output from the AD converter. The controller controls the pixel section and AD converter to subject analog signals of different exposure times to an AD converting process by use of the AD converter and transfer the thus AD-converted signals to the line memory in an accumulation period of charges of one frame. The synthesizer is supplied with digital signals of different exposure times from the line memory, compare a fist signal obtained by adding signals of short and long exposure times with a second signal obtained by amplifying the signal of short exposure time by the ratio of the signal of short exposure time to the signal of long exposure time, select a larger one of the compared signals and output the selected signal.

19 Claims, 11 Drawing Sheets

U.S. PATENT DOCUMENTS

| | | | |
|---|---|---|---|
| 2006/0192867 A1* | 8/2006 | Yosefin | 348/273 |
| 2006/0219866 A1 | 10/2006 | Egawa et al. | |
| 2007/0097240 A1 | 5/2007 | Egawa et al. | |
| 2008/0158398 A1* | 7/2008 | Yaffe et al. | 348/294 |
| 2008/0218599 A1* | 9/2008 | Klijn et al. | 348/229.1 |

OTHER PUBLICATIONS

Morimura, Atsushi, et al. "Wide Dynamic Range Image Processing Technology." National Technical Report. Aug. 1997. 43:4, 455-460.*

U.S. Appl. No. 11/938,462, filed Nov. 12, 2007, Egawa.

U.S. Appl. No. 11/967,585, filed Dec. 31, 2007, Egawa et al.

* cited by examiner

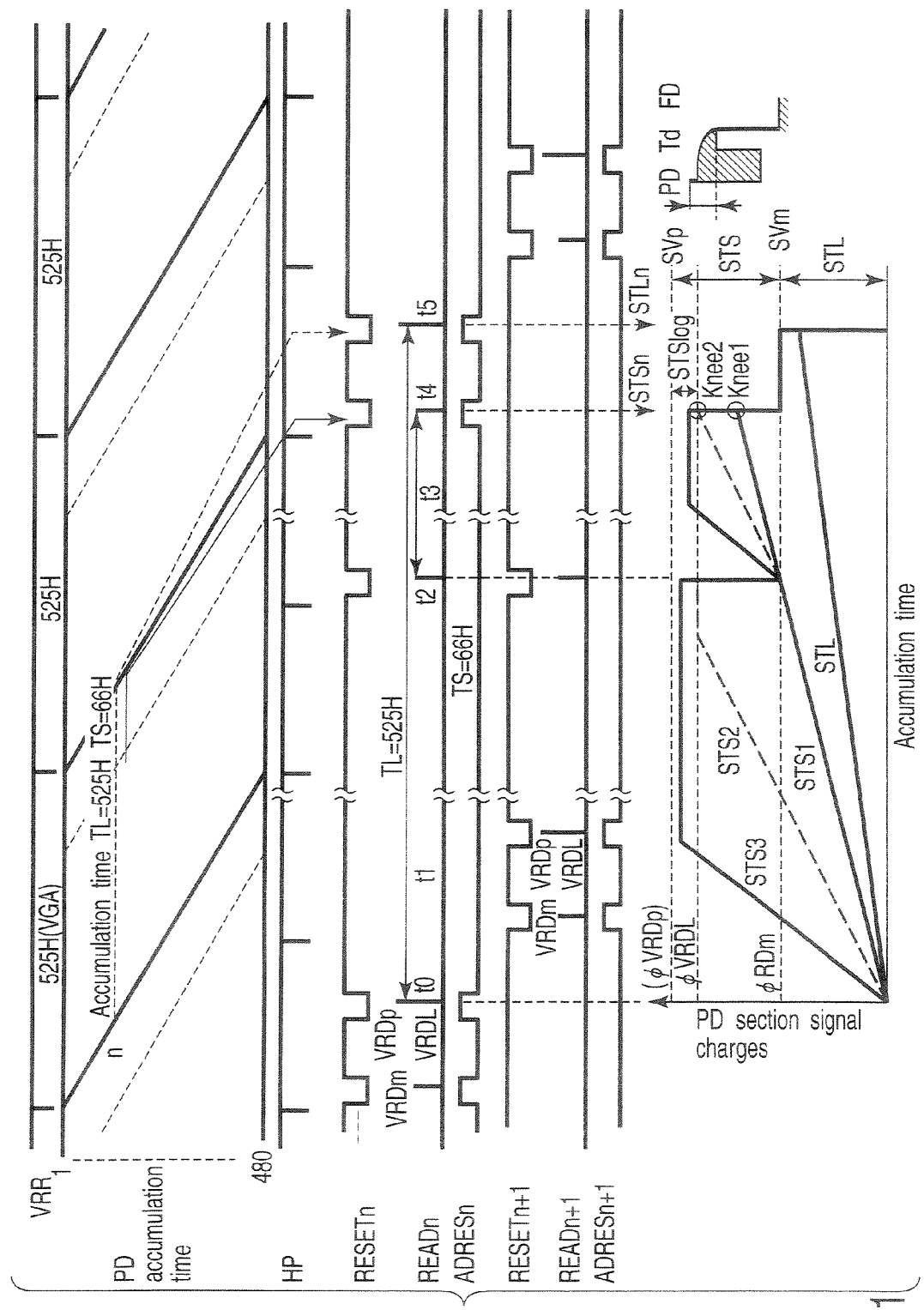
F I G. 11

AMPLIFICATION-TYPE CMOS IMAGE SENSOR OF WIDE DYNAMIC RANGE

CROSS-REFERENCE TO RELATED APPLICATIONS

This application is based upon and claims the benefit of priority from prior Japanese Patent Application No. 2005-315409, filed Oct. 28, 2005, the entire contents of which are incorporated herein by reference.

BACKGROUND OF THE INVENTION

1. Field of the Invention

This invention relates to a solid-state image sensing device which can be applied, for example, to an amplification-type CMOS image sensor used in a mobile telephone with an image sensor, digital camera, video camera or the like.

2. Description of the Related Art

Conventionally, methods for widening the dynamic range of a CMOS image sensor are proposed in Jpn. Pat. Appln. KOKAI Publication No. 2001-189893 and Jpn. Pat. Appln. KOKAI Publication No. 2000-23044, for example. The former method is applied to incomplete transfer type photodiodes, but in this case, there is a possibility that residual images and white defects will occur and it is difficult to enhance the image quality. On the other hand, since the latter method corresponds to complete transfer type photodiodes, there is no possibility that residual images and white defects occur unlike the former method. However, since the dynamic range is widened by use of a detecting section, unevenness of dark-time and KTC noises due to a leak current in the detecting section are generated and there occurs a possibility that the image quality will be degraded due to a factor different from that of the former method. In addition, since signals of long exposure time and short exposure time are added and output in each of the above methods, it is difficult to separate the signals of long exposure time and short exposure time from each other.

BRIEF SUMMARY OF THE INVENTION

According to a first aspect of this invention, there is provided a solid-state image sensing device comprising a pixel section having cells arranged in a two-dimensional form of rows and columns on a semiconductor substrate, each of the cells including photoelectric converting means for converting an optical signal into an electrical signal, reading means for reading signal charges obtained by photoelectrically converting incident light by use of the photoelectric converting means and supplying the thus read signal charges to a detecting section, amplifying means for amplifying and outputting voltage corresponding to the signal charges accumulated in the detecting section and reset means for resetting the signal charges of the detecting section, an AD converting circuit configured to convert an analog signal output from the pixel section into a digital signal and output the thus converted digital signal, a line memory configured to store the digital signal output from the AD converting circuit, a control circuit configured to control the pixel section and AD converting circuit, subject a plurality of analog signals of different exposure times to AD conversion by use of the AD converting circuit and transfer the AD-conversion result to the line memory in a charge accumulation time period of one frame, and a synthesizing circuit configured to be supplied with a plurality of digital signals of different exposure times from the line memory, compare a first signal obtained by adding signals of short and long exposure times with a second signal obtained by amplifying the signal of short exposure time with a ratio of the signal of the short exposure time to the signal of long exposure time, select a larger one of the compared signals and output the selected signal.

According to a second aspect of this invention, there is provided a solid-state image sensing device comprising a pixel section having cells arranged in a two-dimensional form of rows and columns on a semiconductor substrate, an AD converting circuit configured to convert an analog signal output from the pixel section into a digital signal and output the thus converted digital signal, a line memory configured to store the digital signal output from the AD converting circuit, a control circuit configured to control the pixel section and AD converting circuit, subject a plurality of analog signals of different exposure times to AD conversion by use of the AD converting circuit and transfer the AD-conversion result to the line memory in a charge accumulation time period of one frame, and a wide dynamic range mixing circuit configured to be supplied with a plurality of digital signals of different exposure times from the line memory, compare a first signal obtained by adding signals of short and long exposure times with a second signal obtained by amplifying the signal of short exposure time with a ratio of the signal of the short exposure time to the signal of long exposure time, select a larger one of the compared signals and output the selected signal.

BRIEF DESCRIPTION OF THE SEVERAL VIEWS OF THE DRAWING

FIG. 11 is a waveform diagram showing the operation timings of the CMOS image sensor shown in FIG. 10;

DETAILED DESCRIPTION OF THE INVENTION

First Embodiment

Figure 1:
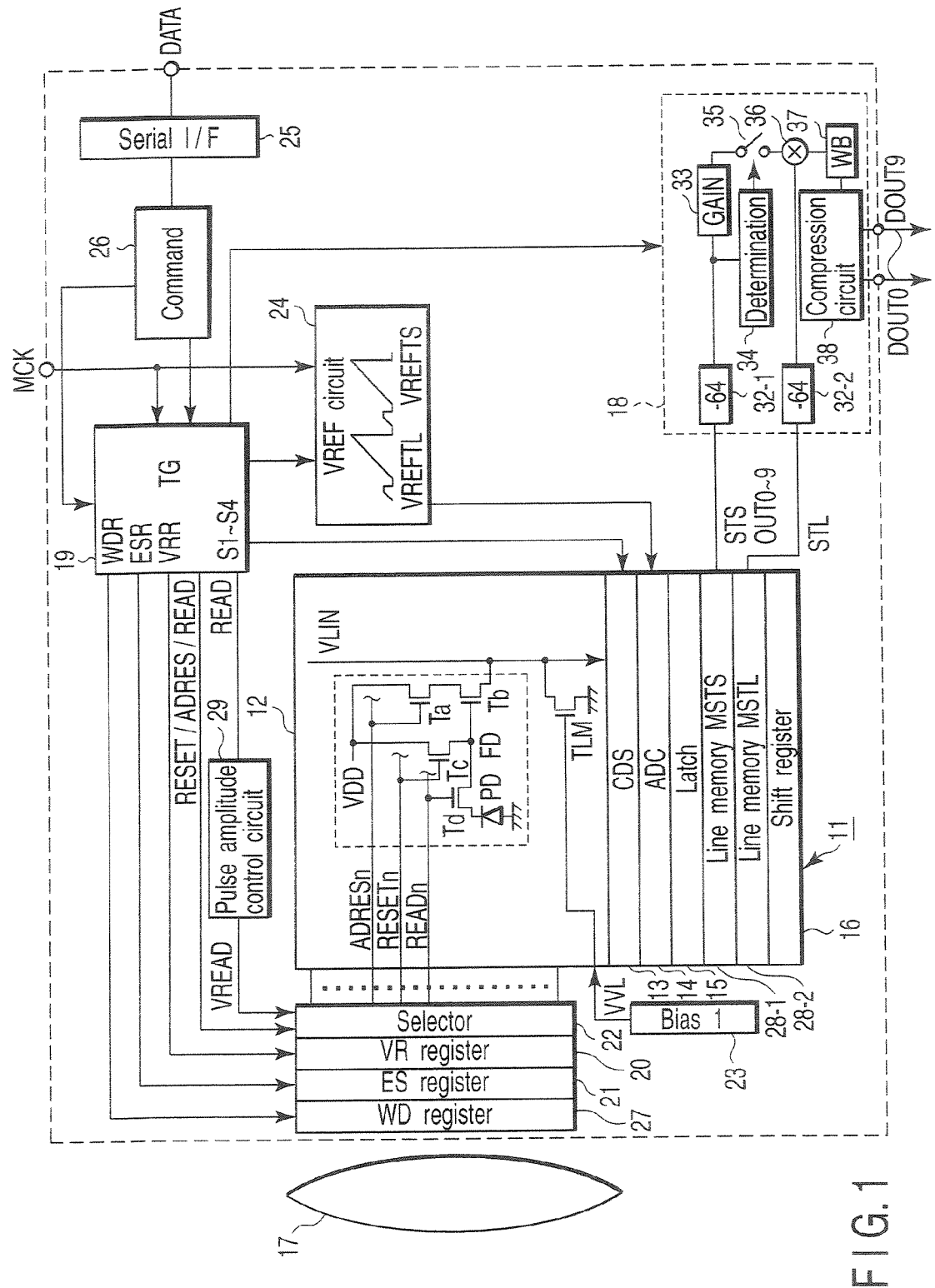
FIG. 1 is a block diagram showing the schematic configuration of an amplification-type CMOS image sensor, for illustrating a solid-state image sensing device according to a first embodiment of this invention.

FIG. 1 is a block diagram showing the schematic configuration of an amplification-type CMOS image sensor, for illustrating a solid-state image sensing device according to a first embodiment of this invention. In a sensor core section 11, a pixel section 12, column type noise canceling circuit (CDS) 13, column type analog-digital converter (ADC) 14, latch circuit 15, two line memories (MSTS, MSTL) 28-1, 28-2, horizontal register 16 and the like are arranged.

Light is incident on the pixel section 12 via a lens 17 and charges corresponding to an incident light amount are generated by photoelectrical conversion. In the pixel section 12, cells (pixels) are arranged in a two-dimensional form of rows and columns on a semiconductor substrate. Each cell is configured by four transistors (Ta, Tb, Tc, Td) and a photodiode (PD) and pulse signals ADRESn, RESETn and READn are supplied to each cell. In the lower portion of the pixel section 12, load transistors TLM of a source follower circuit are arranged in a horizontal direction, one-side ends of the current paths of the load transistors are respectively connected to vertical signal lines VLIN and the other ends thereof are connected to a ground node.

An analog signal corresponding to signal charges generated in the pixel section 12 is supplied to the ADC 14 via the CDS, converted into a digital signal and latched in the latch circuit 15. The digital signal latched in the latch circuit 15 is supplied to the horizontal shift register 16 via the line memories (MSTS, MSTL) 28-1, 28-2 and sequentially transferred. Digital signals OUT0 to OUT9 read out from the line memories (MSTS, MSTL) 28-1, 28-2 are supplied to a wide dynamic range mixing (WDM) circuit 18, subjected to a synthesizing process in the WDM circuit 18 and then output to the exterior of the sensor.

Further, a pulse selector circuit (selector) 22, signal read vertical register (VR register) 20, accumulation time controlling vertical register (ES register, long accumulation time controlling register) 21 and accumulation time controlling vertical register (WD register, short accumulation time controlling register) 27 are arranged adjacent to the pixel section 12.

The read operation from the pixel section 12 and the control operation of the CDS circuit 13 are performed according to pulse signals S1 to S4, READ, RESET/ADRES/READ, VRR, ESR, WDR output from a timing generator (TG) 19. That is, the timing generator 19 acts as a control circuit.

The pulse signals S1 to S4 are supplied to the CDS circuit 13. The pulse signal READ is supplied to a pulse amplitude control circuit 29 and an output signal VREAD of the pulse amplitude control circuit 29 is supplied to the pulse selector circuit 22. Further, the pulse signals RESET/ADRES/READ are also supplied to the pulse selector circuit 22. In addition, the pulse signals VRR, ESR and WDR are respectively supplied to the VR register 20, ES register 21 and WD register 27. One of the vertical lines of the pixel section 12 is selected by the registers 20, 21, 27 and the pulse signals RESET/ADRES/READ (which are representatively shown as RESETn, ADRESn, READn in FIG. 1) are supplied to the pixel section 12 via the pulse selector circuit 22. The pulse signal (address pulse) ADRESn is supplied to the gate of the row selection transistor Ta in the cell, the pulse signal (reset pulse) RESETn is supplied to the gate of the reset transistor Tc in the cell and the pulse signal (read pulse) READn is supplied to the gate of the read transistor Td in the cell. Bias voltage VVL from a bias generating circuit (bias 1) 23 is applied to the pixel section 12. The bias voltage VVL is supplied to the gate of the load transistor TLM of the source follower circuit.

A VREF generating circuit 24 is a circuit which is operated in response to a main clock signal MCK to generate an AD conversion (ADC) reference waveform. The amplitude of the reference waveform is controlled by data DATA input to a serial interface (serial I/F) 25. A command input to the serial interface 25 is supplied to and decoded by a command decoder 26 and then supplied to the timing generator 19 together with the main clock signal MCK. In order to perform the AD conversion operation twice in each horizontal scanning period, the VREF generating circuit 24 generates and supplies triangular waves VREFTL and VREFTS to the ADC 14. The pulse signal READ output from the timing generator 19 is supplied to the amplitude control circuit 29, a three-valued pulse signal VREAD is generated by controlling the amplitude thereof by use of the amplitude control circuit 29 and supplied to the selector 22.

The WDM circuit 18 acts as a synthesizing circuit which subjects the digital signals OUT0 to OUT9 to a synthesizing process. The WDM circuit 18 includes subtracter circuits (−64) 32-1, 32-2 which perform a subtraction process of 64LSB of a black level, a gain circuit (GAIN) 33 which amplifies an output of the subtracter circuit 32-1, determination circuit 34, switch 35, adder circuit 36, white balance processing circuit (WB) 37 and compression circuit 38. The WDM circuit 18 is simultaneously supplied with a signal STS of short exposure time (charge accumulation time) stored in the line memory 28-1 and a signal STL of long exposure time stored in the line memory 28-2.

First, since the black level is set at the 64LSB level in the analog/digital conversion operation by the ADC 14, the black level 64 is subtracted from each of the outputs of the line memories 28-1, 28-2 by use of the subtracter circuits 32-1, 32-2. Next, the signal STS subjected to the subtraction process is amplified by the gain circuit 33. The gain amount can be calculated based on the exposure time ratio of TL/TS if the exposure times of the signals STL and STS are respectively set to TL and TS. By performing the process of multiplying the signal STS by the gain, the inclinations of the photoelectric conversion characteristic curves can be equivalently set to the same even if the inclinations thereof are different. When the signal STS is output, the signal STL is saturated. The switch 35 is turned ON by the determination circuit 34 to smoothly synthesize the signals STS and STL by adding the signal STL and the signal STS multiplied by the gain by use of the adder 36. The number of bits of the added output signal is increased and the signal of 14 bits is output. Then, the levels of R, G, B signals are processed and set to the same level by the white balance (WB) processing circuit 37 and each signal is compressed to 10 bits in the compression circuit 38 and output.

Figure 2:
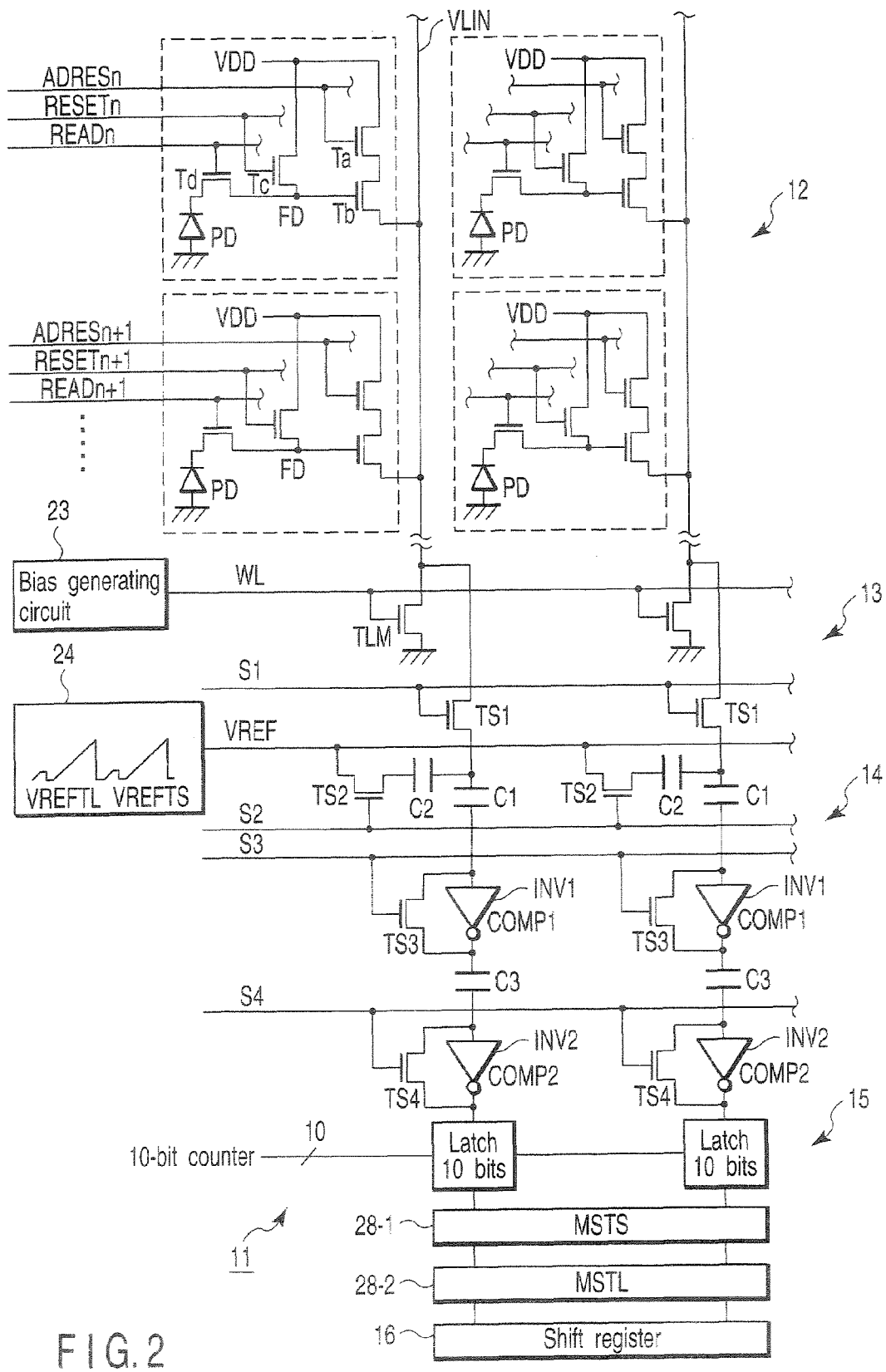
FIG. 2 is a circuit diagram showing a concrete configuration example of a pixel section, CDS circuit and ADC of the amplification-type CMOS image sensor shown in FIG. 1.

FIG. 2 is a circuit diagram showing a concrete configuration example of the pixel section 12, CDS circuit 13 and ADC 14 of the amplification-type CMOS image sensor shown in FIG. 1. Each cell (pixel) of the pixel section 12 is configured by a row selection transistor Ta, amplifying transistor Tb, reset transistor Tc, read transistor Td and photodiode PD. The current paths of the transistors Ta, Tb are serially connected between a power supply VDD and a vertical signal line VLIN.

A pulse signal ADRESn is supplied to the gate of the transistor Ta. The current path of the transistor Tc is connected between the power supply VDD and the gate (detecting section FD) of the transistor Tb and a pulse signal RESETn is supplied to the gate thereof. Further, one end of the current path of the transistor Td is connected to the detecting section FD and a pulse signal READn is supplied to the gate thereof. The other end of the current path of the transistor Td is connected to the cathode of the photodiodes PD and the anode of the photodiode PD is grounded.

The cells with the above configuration are arranged in a two-dimensional form of row and columns to configure the pixel section 12. In the lower portion of the pixel section 12, load transistors TLM of a source follower circuit are arranged in a horizontal direction. The current paths of the load transistors TLM are connected between the respective vertical signal lines VLIN and the ground node and bias voltage VVL from the bias circuit 23 is applied to the gates thereof. Noise canceling capacitors C1, C2 are arranged in the CDS circuit 13 and ADC 14, and transistors TS1 which transmit corresponding signals of the vertical signal lines VLIN, transistors TS2 which input the reference wave used for AD conversion and two-stage comparator circuits COMP1, COMP2 are arranged. Capacitors C3 are respectively connected between the comparator circuits COMP1 and the comparator circuits COMP2. The comparator circuit COMP1 is configured by an inverter INV1 and a transistor TS3 whose current path is connected between the input and output terminals of the inverter INV1. The comparator circuit COMP2 is configured by an inverter INV2 and a transistor TS4 whose current path is connected between the input and output terminals of the inverter INV2. Pulse signals S1, S2, S3 and S4 output from the timing generator 19 are respectively supplied to the gates of the transistors TS1, TS2, TS3 and TS4. A digital signal output from the comparator circuit COMP2 is latched by the latch circuit 15 and input to the line memories 28-1, 28-2. A line memory signal causes the shift register 16 to be operated and permits 10-bit digital signals OUT0 to OUT9 to be sequentially output from the line memories 28-1, 28-2.

With the above configuration, for example, the source follower circuit configured by the amplifying transistor Tb and load transistor TLM is operated by setting the pulse signal ADRESn to the "H" level in order to read a signal of an n-th line of the vertical signal line VLIN. Then, signal charges obtained by photoelectric conversion by use of the photoelectric diode PD are accumulated for a preset period of time, the pulse signal RESETn is set to the "H" level to turn ON the transistor Tc and set the detecting section FD to the VDD voltage=2.8 V in order to eliminate a noise signal such as a dark current in the detecting section FD before the read operation is performed. Thus, voltage (reset level) in a state in which no signal used as a reference is present in the detecting section FD is output to the vertical signal line VLIN. At this time, the AD conversion levels of the comparator circuits COMP1 and COMP2 of the ADC 14 are set and charges of an amount corresponding to the reset level of the vertical signal line VLIN are accumulated in the capacitor C1 by setting the pulse signals S1, S3 and S4 to the "H" level and turning ON the transistors TS1, TS3 and TS4.

Next, the pulse signal (read pulse) READn is set to the "H" level to turn ON the read transistor Td and read and supply signal charges generated and accumulated in the photodiode PD to the detecting section FD. As a result, a voltage (signal+reset) level of the detecting section FD is read and supplied to the vertical signal line VLIN. At this time, the pulse signals S1, S3, S4 and S2 are respectively set to the "H" level, "L" level, "L" level and "H" level to respectively set the transistors TS1, TS3, TS4 and TS2 into the ON state, OFF state, OFF state and ON state. Thus, charges corresponding to "signal of vertical signal line VLIN+reset level" are accumulated in the capacitor C2. At this time, the capacitor C1 is kept set at the reset level since the input terminal of the comparator circuit COMP1 is set in the high impedance state.

After this, the level of the reference wave is subjected to the AD conversion process in the comparator circuits COMP1, COMP2 via the combined capacitor of the capacitors C1 and C2 by increasing the level of the reference wave (increasing the triangular wave VREF from the low level to the high level) output from the VREF generating circuit 24. The triangular wave is generated in 10 bits (0 to 1023 levels), the AD-converted level is determined by use of a 10-bit counter and data is held in a latch circuit. After AD conversion of 1023 levels, data of the latch circuit is transferred to the line memory. Since the polarity of the reset level accumulated in the capacitor C1 is opposite to that of the reset level accumulated in the capacitor C2, the reset level is canceled and the AD conversion process is performed by substantially using the signal component of the capacitor C2. The operation of eliminating the reset level is called a noise reduction processing operation (CDS operation: Correlated Double Sampling operation). In order to perform the AD conversion operation twice in each horizontal scanning period, triangular waves VREFTL and VREFTS are generated by the VREF generating circuit 24 and supplied to one end of the current path of the transistor TS2.

Figure 3:
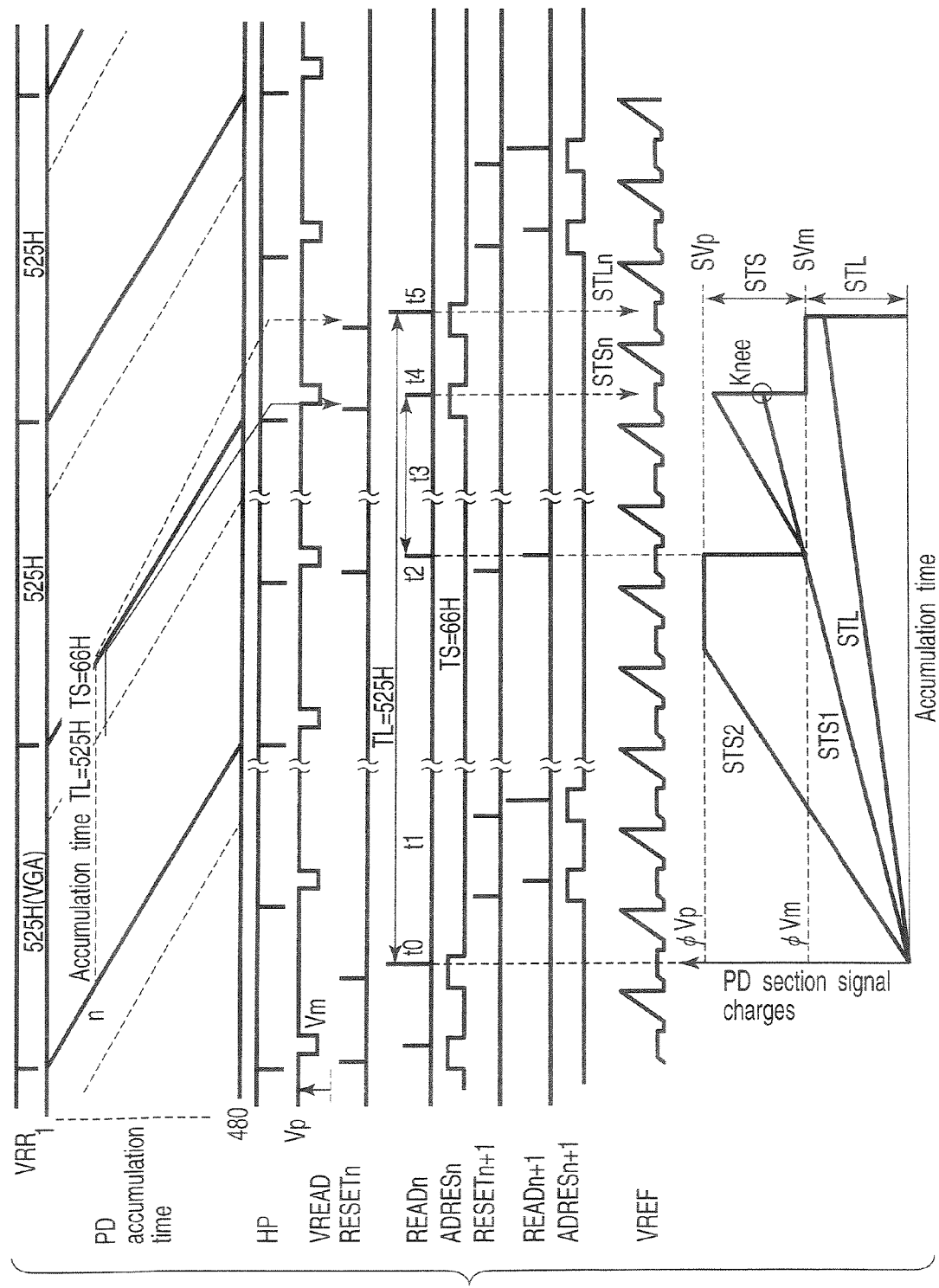
FIG. 3 is a waveform diagram showing the operation timings of the CMOS image sensor shown in FIGS. 1 and 2.

FIG. 3 is a waveform diagram showing the operation timings of the CMOS image sensor shown in FIGS. 1 and 2. In the case of a VGA sensor, it is driven with each frame of 30 Hz and the number of horizontal scanning lines of 525 H. The accumulation time TL in which charges generated by photoelectric conversion by use of the photodiode PD are accumulated in the n-th vertical line is set to 525 H. A signal charge amount accumulated in the detecting section FD is detected and read by supplying pulse signals RESETn, READn and ADRESn to the pixel section 12 in synchronism with the horizontal synchronization pulse HP to perform the photoelectric conversion process by use of the photodiode PD. At this time, the amplitude of VREF is set at an intermediate level and read. The intermediate level is automatically adjusted in the sensor so as to set the light shielding pixel (OB) portion of the pixel section 12 to 64LSB. The thus read signal causes a triangular wave to be generated as a reference waveform in the first half period of 0.5 H of the horizontal scanning period and permits a 10-bit AD conversion process to be performed. The AD-converted signal (digital data) is held in the latch circuit 15 and output as an STL signal by the sensor core section 11 in the next horizontal scanning period.

In this case, the exposure time (accumulation time) TL in which charges generated by photoelectric conversion by use of the photodiode PD of the n-th vertical line are accumulated is set to 525 H. Further, the short exposure time TS is set to 66 H. The long exposure time TL is controlled with the amplitude of the read pulse READ set at the high level (Vp)=2.8 V. The short exposure time TS is controlled with the amplitude of the read pulse READ set at the intermediate level (Vm)=1.4 V. In order to generate the pulse signals READ with the different amplitude levels, the amplitude of the pulse signal READ is controlled by the pulse amplitude control circuit 29. The exposure time TL can be controlled for each time period of 1 H by use of the ES register 21. Further, by applying the technique described in Jpn. Pat. Appln. KOKAI Publication No. 2001-111900 by the applicant of this invention, it can be controlled by use of exposure time shorter than the time period of 1 H. That is, since the time period from time t2 to time t4 in FIG. 3 corresponds to the time period of 1 H, a time period used to discharge charges in a time period of H/2 or H/4 may be set within the time period of 1 H. Further, the exposure time TS can be controlled for each time period of 1 H by use of the WD register 27.

At the time (t4) of the first read operation from the photodiode PD, pulse signals RESETn, READn and ADRESn are supplied to the pixel section 12 in synchronism with the horizontal synchronization pulse HP to read signal charges photoelectrically converted by and accumulated in the photodiode PD. The amplitude of the pulse signal READ at this time is set to the intermediate level Vm. The signal charges read at the first time are discharged by supplying the pulse signal READ of the intermediate level Vm at the intermediate time (t2) of the accumulation time period 525 H to read part of the signal charges of the photodiode PD. Then, a signal re-accumulated in the time period from time t2 to time t4 is read from the photodiode PD (t4).

The thus read signal causes a triangular wave to be generated as a reference waveform in the first half period of 0.5 H of the horizontal scanning period and permits a 10-bit AD conversion process to be performed. The AD-converted signal is supplied to and held in the latch circuit 15 and stored in the line memory (MSTS) 28-1. At the time (t5) of the second read operation from the photodiode PD, pulse signals RESETn, READn and ADRESn are supplied to the pixel section 12 when 0.5 H has elapsed after the first operation to read signal charges photoelectrically converted by and accumulated in the photodiode PD. The amplitude of the pulse signal READ at this time is set to the high level Vp.

Next, like the first operation, signal charges of TL=525 H photoelectrically converted by and accumulated in the photodiode PD are read by supplying pulse signals RESETn, READn and ADRESn to the pixel section 12. The thus read signal causes a triangular wave to be generated as a reference waveform in the latter half period of 0.5 H of the horizontal scanning period and permits a 10-bit AD conversion process to be performed. The AD-converted signal is held in the latch circuit 15 and input to and stored in the line memory (MSTL) 28-2. The thus stored data items (digital signals) STS and STL of the line memories 28-1, 28-2 are read from the line memories 28-1, 28-2 in a next horizontal scanning period, supplied to the wide dynamic range mixing (WDM) circuit 18 and subjected to a signal processing operation.

Next, the accumulating operation of signal charges in the photodiode (PD) section is explained. At the time t0, all of the signal charges of the photodiode PD section are discharged by applying 2.8 V as a pulse signal READ. At the time t1, a signal which is photoelectrically converted by the photodiode PD section is accumulated. At the time t2, a signal which is substantially equal to half the saturated signal amount ΦVp is read from the photodiode PD section and discharged with the voltage of the pulse signal READ set at 1.4 V. An excessively large signal of the signal STS2 is sliced at ΦVm. The signal STL is not discharged because the signal amount thereof is small. At the time t3, a signal is re-accumulated in the photodiode PD section. At the time t4, signal charges larger than ΦVm are read as a signal STS with the voltage of the pulse signal READ set at 1.4 V. As a result, a signal STS1 or STS2 larger than SVm is output. At this time, the level of the signal STL is sufficiently low and the signal is not read. At the next time t5, signal charges equal to or lower than ΦVm in the photodiode PD section are read as a signal STL. Since the signal STS1 or STL which is lower than the Knee point at the time t4 is not discharged from the photodiode PD section at the time t2, continuously accumulated signal charges can be obtained. On the other hand, since the signal STS2 discharged from the photodiode PD section at the time t2 is sliced at the ΦVm level, a state in which the accumulation time is apparently stopped is set. The inclination of the photoelectric conversion characteristic is changed at the Knee point. That is, a signal having the Knee point in the signal STS read at the time t4 is output.

With the above configuration, since signals of long and short exposure times are separately subjected to the AD conversion process in each horizontal scanning period and output and two read digital signals are added, the dynamic range can be enlarged without lowering the image quality.

Second Embodiment

Figure 4:
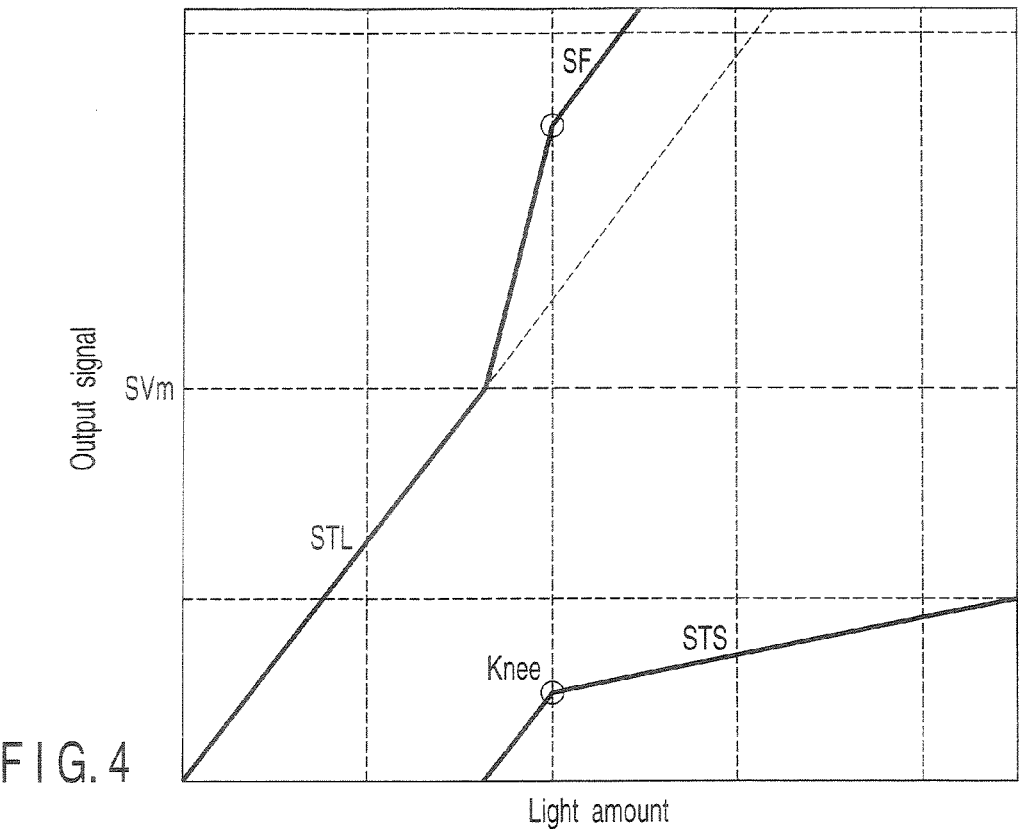
FIG. 4 is a characteristic diagram showing the photoelectric conversion characteristic of the CMOS image sensor shown in FIGS. 1 and 2.

FIG. 4 shows the photoelectric conversion characteristic of the CMOS image sensor shown in FIGS. 1 and 2. A signal STL is saturated at an SVm level. If the signal STL is saturated, a signal STS is output. When the level of the signal STS is increased, a Knee point is generated and the inclination thereof is suppressed by the accumulation time ratio TS/TL. Therefore, if the signal processing operation is performed by use of a WDM circuit 18 with the configuration as shown in FIG. 1, a small-signal portion of the signal STS is greatly amplified and added and, as a result, the level of an added output signal SF is lifted in a range higher than SVm. The inclination of a portion after the Knee point is set to the same as that of the signal STL, but the signal is lifted by an amount corresponding to the offset. However, when the accumulation time ratio TS/TL is sufficiently low, the Knee point is set at substantially the same level as ΦVm, and therefore, the signal can be practically used.

In the waveform diagram shown in FIG. 3, the signal can be practically used by setting the READ voltage of the time t4 lower than 1.4 V and making adjustment to read only a portion higher than the Knee point. However, the system and adjustment become complicated in order to cope with a variation in the power supply voltage and a variation between samples.

Figure 5:
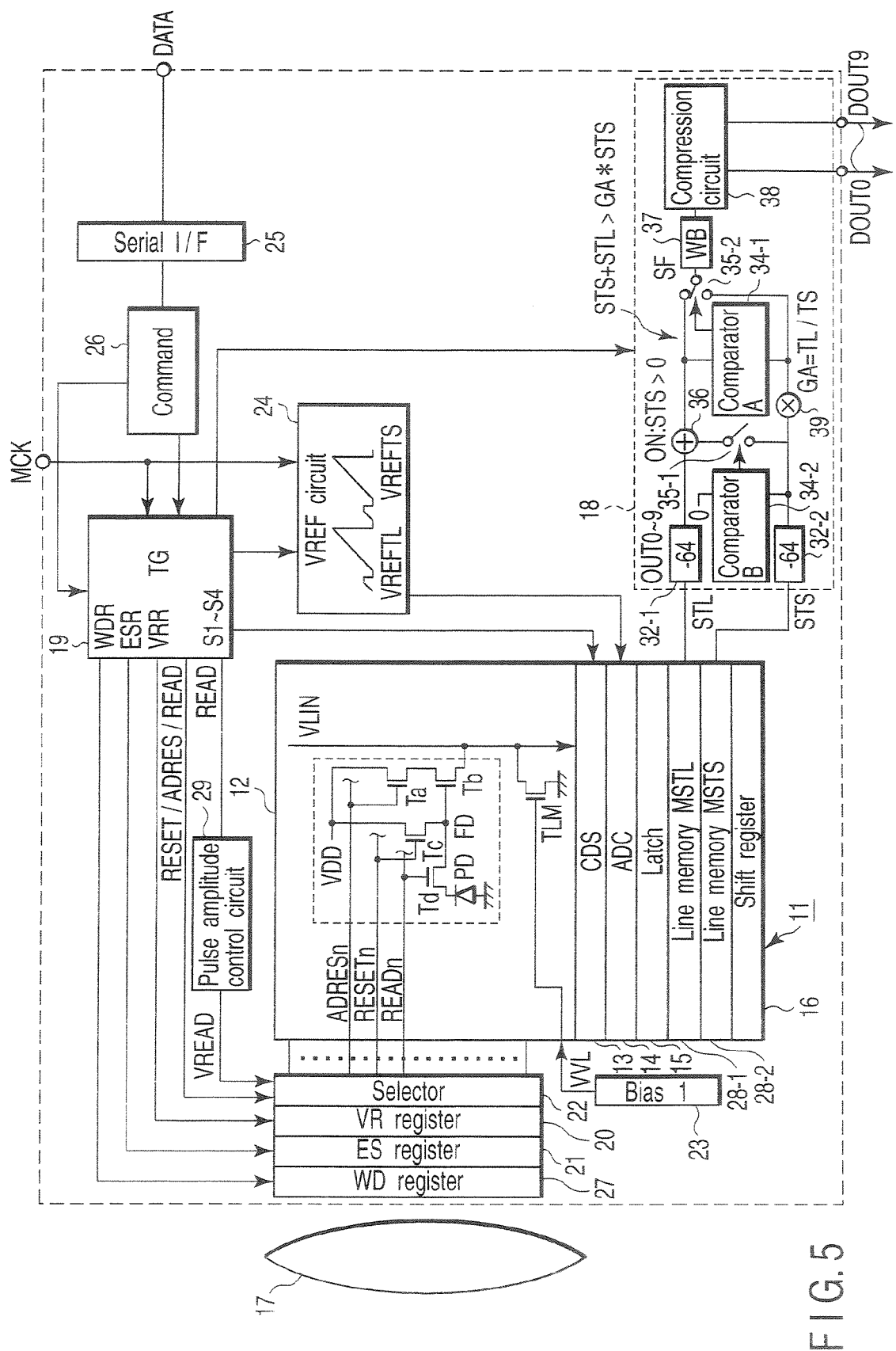
FIG. 5 is a block diagram showing the schematic configuration of an amplification-type CMOS image sensor, for illustrating a solid-state image sensing device according to a second embodiment of this invention.

FIG. 5 is a block diagram showing the schematic configuration of an amplification-type CMOS image sensor, for illustrating a solid-state image sensing device according to a second embodiment of this invention. In the second embodiment, the circuit configuration of the wide dynamic range mixing (WDM) circuit 18 is modified to improve the first embodiment and suppress an influence by the offset.

In FIG. 5, portions which are the same as those of FIG. 1 are denoted by the same reference symbols and the detail explanation thereof is omitted. Further, the concrete configurations of a pixel section 12, CDS circuit 13 and ADC 14 are substantially the same as those of FIG. 2.

The WDM circuit 18 of the amplification-type CMOS image sensor includes subtracter circuits 32-1, 32-2 which perform a subtraction process of 64LSB of a black level, determination circuits (comparator A, comparator B) 34-1, 34-2, switches 35-1, 35-2, adder circuit 36, white balance processing circuit (WB) 37, compression circuit 38 and amplifier circuit 39. Like the circuit shown in FIG. 1, the WDM circuit 18 is simultaneously supplied with a signal STS of short exposure time stored in the line memory 28-1 and a signal STL of long exposure time stored in the line memory 28-2.

When the signal STS starts to be output from the subtracter circuit 32-2, the switch 35-1 is turned ON by the determination circuit 34-2 to operate the adder circuit 36 so as to add the signals STS and STL. The added signal is represented by "STS+STL". When the signal STS is not output, STS+

STL=STL. The signal STS is amplified and multiplied by the accumulation time ratio TL/TS by use of the amplifier circuit (GA) 39 (GA=TL/TS).

Then, "STS+STL>GA*STS" is determined by the determination circuit 34-1 to control the switch 35-2. After this, the signal "STS+STL" obtained by adding the signals of long and short exposure times is compared with the signal "GA*STS" obtained by amplifying the signal STS of short exposure time by the ratio TL/TS of the signal of long exposure time to the signal of short exposure time and the switching operation is performed so as to select a signal having a larger digital value corresponding to the voltage. Then, the white balance (WB) process is performed to set the R, G, B signals to the same level and the signals are compressed to 10 bits (DOUT0 to DOUT9) by the compression circuit 38.

Figure 6:
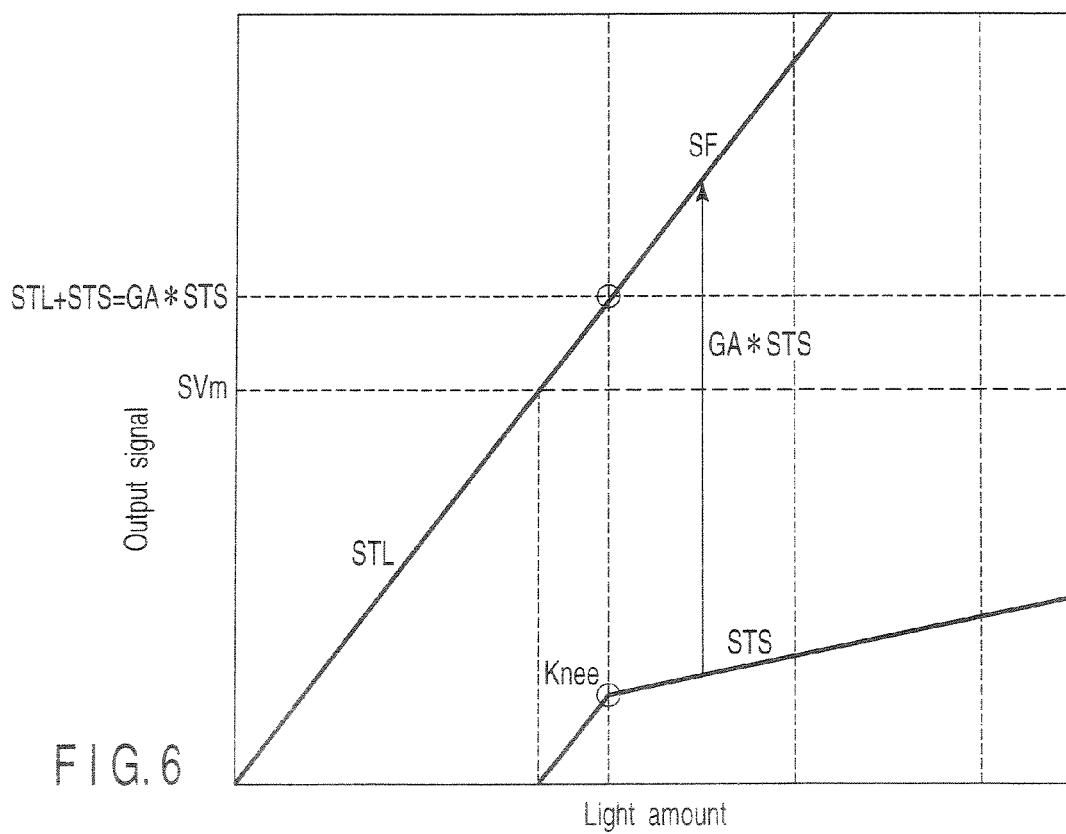
FIG. 6 is a characteristic diagram showing the first photoelectric conversion characteristic of the CMOS image sensor shown in FIG. 5.

FIG. 6 is a characteristic diagram showing the photoelectric conversion characteristic of the CMOS image sensor shown in FIG. 5. Like the circuit shown in FIG. 1, the signal STL is saturated at the SVm level. When the signal STL is saturated, a signal STS is output. When the signal STS is increased to a certain level, a Knee point is generated and the inclination of the signal is suppressed by the accumulation time ratio TS/TL.

However, if the signal is processed by use of the WDM circuit 18 shown in FIG. 5, a signal obtained by linearly adding the signals STS and STL is output up to the Knee point or a point of "STL+STS=GA*STS". Then, the signal STS is switched to a signal multiplied by GA in a portion exceeding the Knee point and output as a signal SF. Thus, an influence by the offset can be suppressed by switching the signal to a signal multiplied by GA in a portion exceeding the Knee point.

As described above, according to the second embodiment, the operation of enlarging the dynamic range which is stable and difficult to receive influences by the power supply voltage and the operation temperature of the sensor can be performed. Further, the operation of accumulating signal charges of different exposure times not only in the same photodiode but also in the detecting section or accumulating section (in the case of a sensor having the accumulating section) and separately reading the accumulated signal charges is performed. Then, the color reproducibility of a high-luminance portion can be improved by improving the linearity of the photoelectric conversion characteristic in the operation of enlarging the dynamic range by synthesizing the signal of long exposure time with the signal of short exposure time which is amplified by the exposure time (accumulation time) ratio.

Third Embodiment

Figure 7:
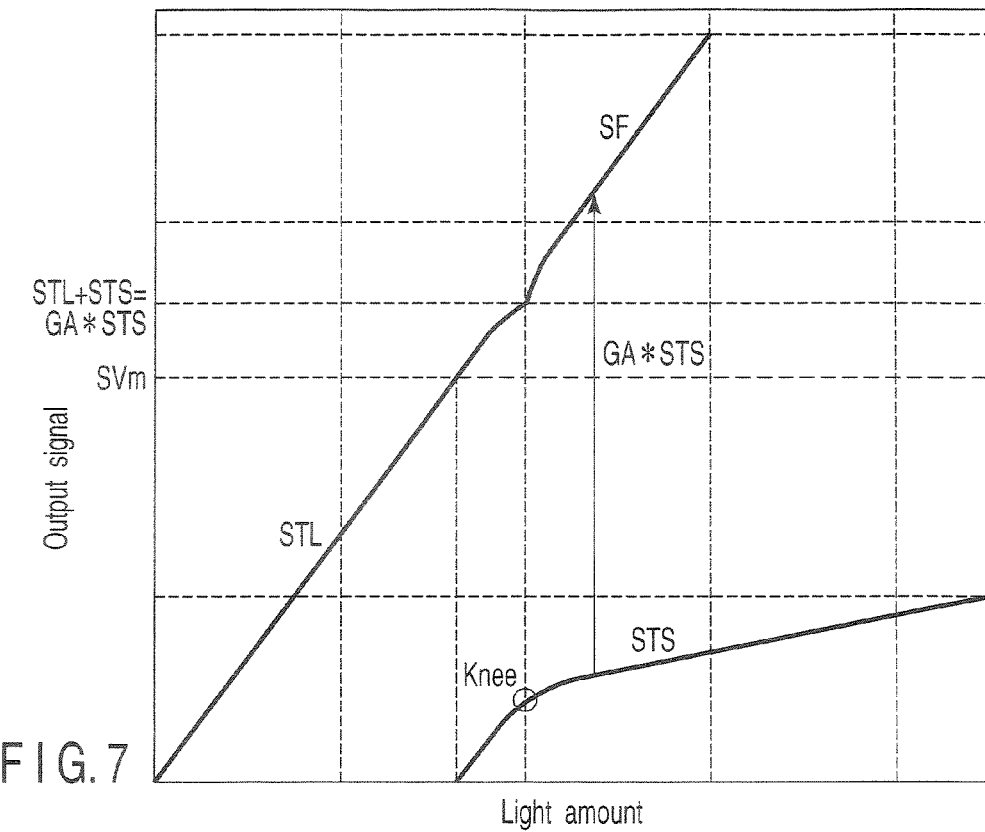
FIG. 7 is a characteristic diagram showing the second photoelectric conversion characteristic of the CMOS image sensor shown in FIG. 5.

In the second embodiment, the photodiode PD section performs an incomplete transfer operation in a portion near the Knee point of the signal STS as more precisely shown in FIG. 7. Therefore, a state in which a residual image occurs and the signal becomes difficult to be read is set and the characteristic is smoothly curved. When signal charges of an amount sufficiently larger than that of the Knee point are present in the photodiode PD section, the signal charges themselves act as bias charges to suppress occurrence of the residual image, and therefore, no residual image occurs and the characteristic linearly varies. If the Knee point having the smooth characteristic curve is subjected to the WDM process, the linearity of the synthesized signal SF is deteriorated in a portion near the Knee point. In the experiment, a deterioration of 5% at maximum occurs with respect to the ideal characteristic.

Figure 8:
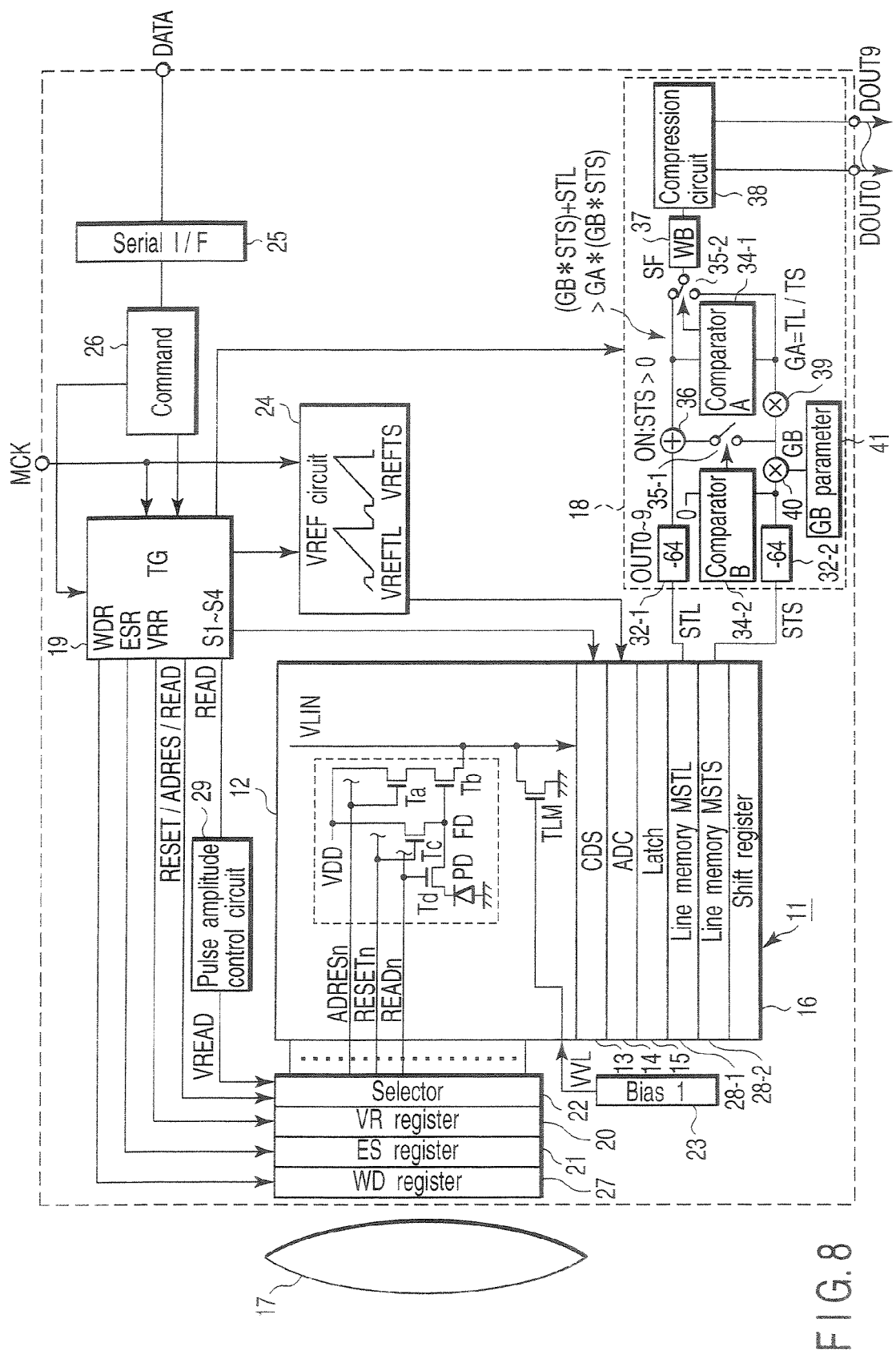
FIG. 8 is a block diagram showing the schematic configuration of an amplification-type CMOS image sensor, for illustrating a solid-state image sensing device according to a third embodiment of this invention.

FIG. 8 is a block diagram showing the schematic configuration of an amplification-type CMOS image sensor, for illustrating a solid-state image sensing device according to a third embodiment of this invention. The third embodiment is obtained by further improving the second embodiment and is to suppress the linearity of the synthesized signal SF from being deteriorated in a portion near the Knee point due to the residual image component.

That is, the circuit shown in FIG. 8 is obtained by providing a gain circuit (GB) 40 which amplifies a signal STS in the WDM circuit 18 of the amplification-type CMOS image sensor shown in FIG. 5. The amplification factor of the gain circuit 40 is set by a GB parameter 41. Further, the internal configurations of the determination circuits 34-1, 34-2 are modified according to the above modification. The determination circuit 34-2 operates the adder circuit 36 when a signal GB*STS starts to be output and outputs a signal "GB*STS+STL". When the signal GB*STS is not output, the relation of "GB*STS+STL=STL" is obtained. Further, the signal GB*STS is amplified by the accumulation time ratio TL/TS by use of an amplifier circuit (GA). Then, the relation of "GB*STS+STL>GB*(GA*STS)" is determined by the determination circuit 34-1 and the signal is switched.

Since the other basic configuration is the same as that of FIG. 5, portions which are the same as those of FIG. 5 are denoted by the same reference symbols and the detail explanation thereof is omitted. Further, the concrete configurations of a pixel section 12, CDS circuit 13 and ADC 14 are substantially the same as those of FIG. 2.

Figure 9:
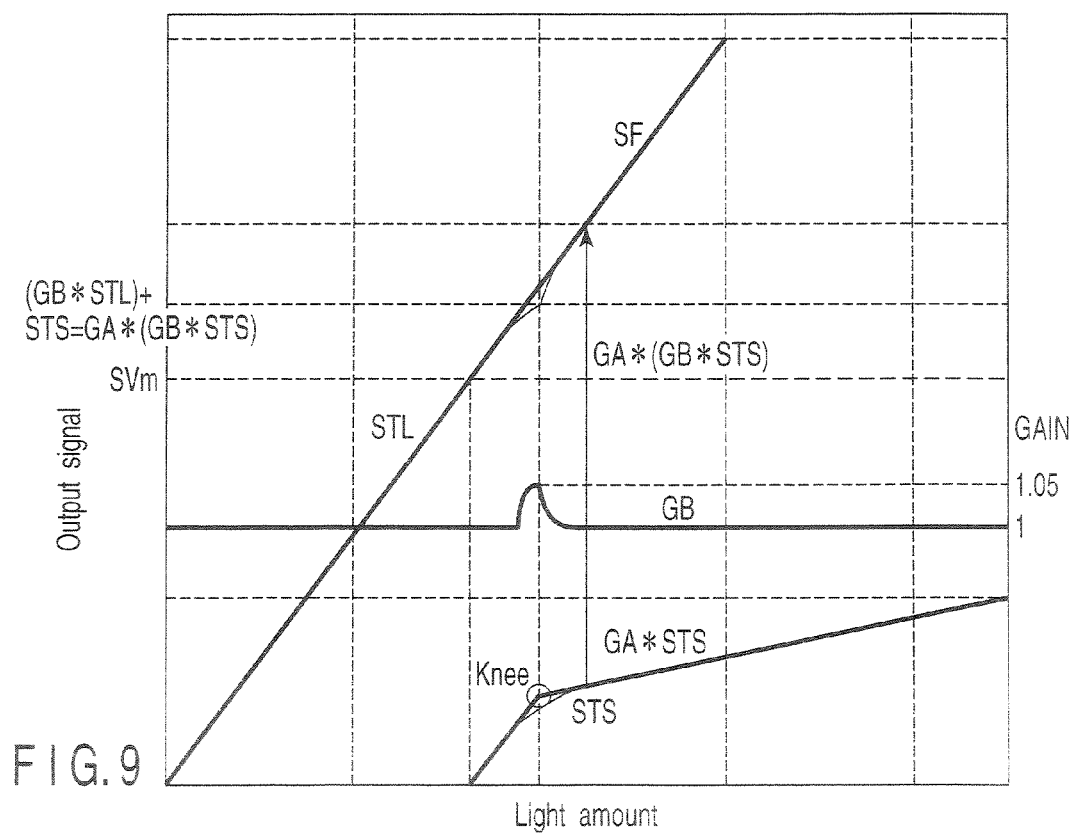
FIG. 9 is a characteristic diagram showing the photoelectric conversion characteristic of the CMOS image sensor shown in FIG. 8.

FIG. 9 is a characteristic diagram showing the photoelectric conversion characteristic of the CMOS image sensor shown in FIG. 8. The amplification factor of the gain circuit (GA) 40 is set to set the GB parameter 41 to an amplification pattern near the time constant of a resistor and capacitor so as to set the amplification factor of a portion near the Knee point to 1.05 at maximum. The GB parameter 41 can be changed according to the accumulation time ratio TL/TS.

Fourth Embodiment

Figure 10:
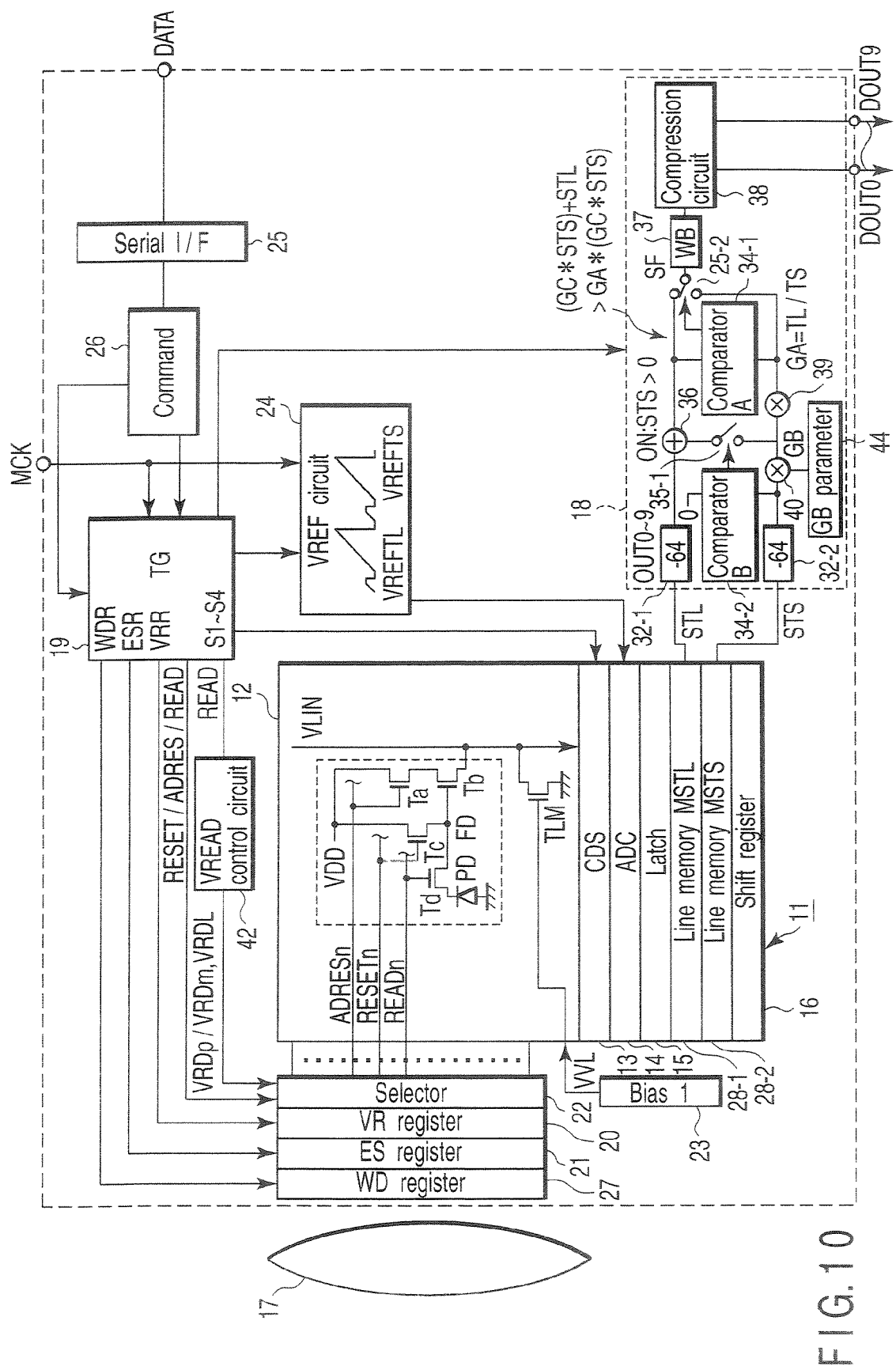
FIG. 10 is a block diagram showing the schematic configuration of an amplification-type CMOS image sensor, for illustrating a solid-state image sensing device according to a fourth embodiment of this invention.

FIG. 10 is a block diagram showing the schematic configuration of an amplification-type CMOS image sensor, for illustrating a solid-state image sensing device according to a fourth embodiment of this invention. In the fourth embodiment, the LO level of a pulse signal READ is set to VRDL voltage in the CMOS image sensor shown in FIG. 8 by use of a VREAD control circuit 42. The HI level can be selectively set to VRDp or VRDm voltage. In order to attain the above operation, an amplifier circuit (GC) 43 is provided in the WDM circuit 18 and the amplification factor of the amplifier circuit 43 is set by a GC parameter 44.

In FIG. 10, portions which are the same as those of FIG. 8 are denoted by the same reference symbols and the detail explanation thereof is omitted. Further, the concrete configurations of a pixel portion 12, CDS circuit 13 and ADC 14 are the same as those of FIG. 2.

FIG. 11 is a waveform diagram showing the operation timings of the CMOS image sensor shown in FIG. 10. A pulse signal RESET and pulse signal READ are different from those of FIG. 3. The pulse signal RESET is set in the ON state of 2.8 V in almost the entire period to reset signal charges overflowing from the photodiode. The pulse signal is set at 0 V only when a reset level or signal level is read from the pixel. The LO level of the pulse signal READ is set at VRDL=1 V. Further, the intermediate level is set at VRDm=1.4 V and the HI level is set at VRDp=2.8 V. By the above operation, a signal of signal charges accumulated in the photodiode PD section and larger than ΦVRDL is clipped, but the amount of signal charges of the photodiode PD section is increased by strong incident light. The variation point is set as Knee2. The above increase logarithmically becomes larger with respect to the incident light amount. When the incident light amount is small, a signal amount flowing from the photodiode PD section into FD via the read transistor Td is small. However, when the incident light amount is large, a signal amount flowing from the photodiode PD section into FD via the read transistor Td is large. That is, a larger signal is more difficult to remain in the photodiode PD section. A signal of the photodiode PD section becomes a signal STSlog in which signal charges logarithmically increase in proportion to the incident light amount.

In this case, VRDL is set at 1 V, but it is also possible to set the ON state at 0 V by setting VRDL at 0 V and configuring the read transistor Td as a depletion type transistor.

Figure 12:
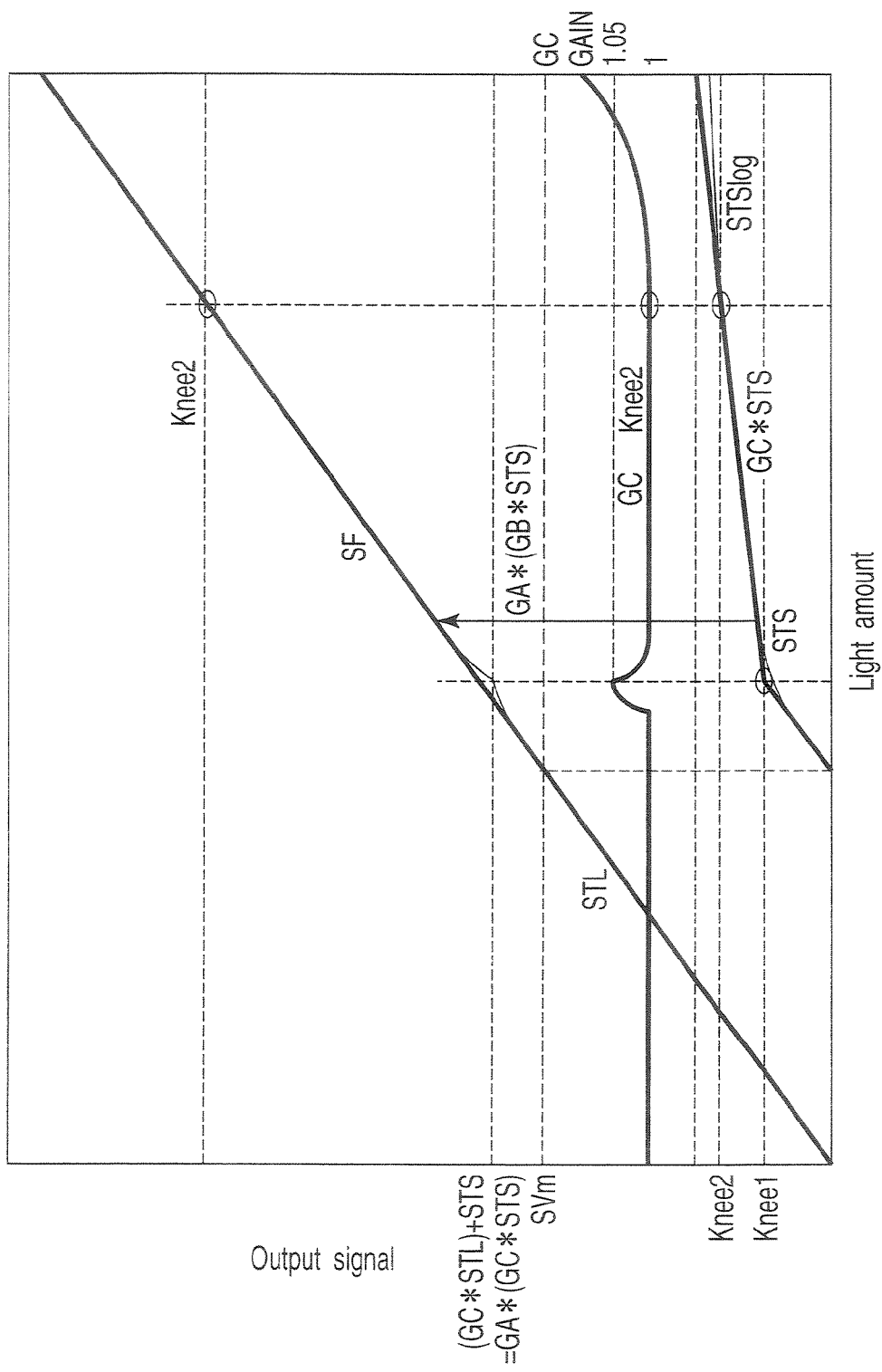
FIG. 12 is a characteristic diagram showing the photoelectric conversion characteristic of the CMOS image sensor shown in FIG. 10.

FIG. 12 shows the photoelectric conversion characteristic of the CMOS image sensor shown in FIG. 10. When a light amount of the signal STS is larger than that of Knee2, the HI level of the signal STSlog is compressed. The STSlog signal region of GC*STS is converted into a straight line by setting the GC parameter larger than Knee2 of the WDN circuit 18 according to the gain of the inverse logarithm of the log characteristic. As a result, the signal SF is also converted into a straight line. By the above line converting operation, the precision of the white balance (WB) of R, G, B signals of a color image having different signal levels can be enhanced. In the log region, almost all of the signals tend to become white signals because they are high-luminance signals. Therefore, the signals can be replaced by colorless white signals by replacing R, B signals by G signals. Thus, there occurs no problem even if signal levels are made different by the linear transformation process for the log curve characteristics of the R, G, B signals.

Further, certain color reproducibility can be attained without lowering the resolution (the number of bits of a digital signal) of a light input signal of intermediate luminance by setting the accumulation time ratio in a period from Knee1 to Knee2 in a range of ⅛ to 1/16. Further, a signal of high luminance can be attained (in the second embodiment, if an attempt is made to attain a signal of high luminance, the resolution of an intermediate-luminance signal cannot be enhanced because the accumulation time ratio is set to 1/128).

Figure 13:
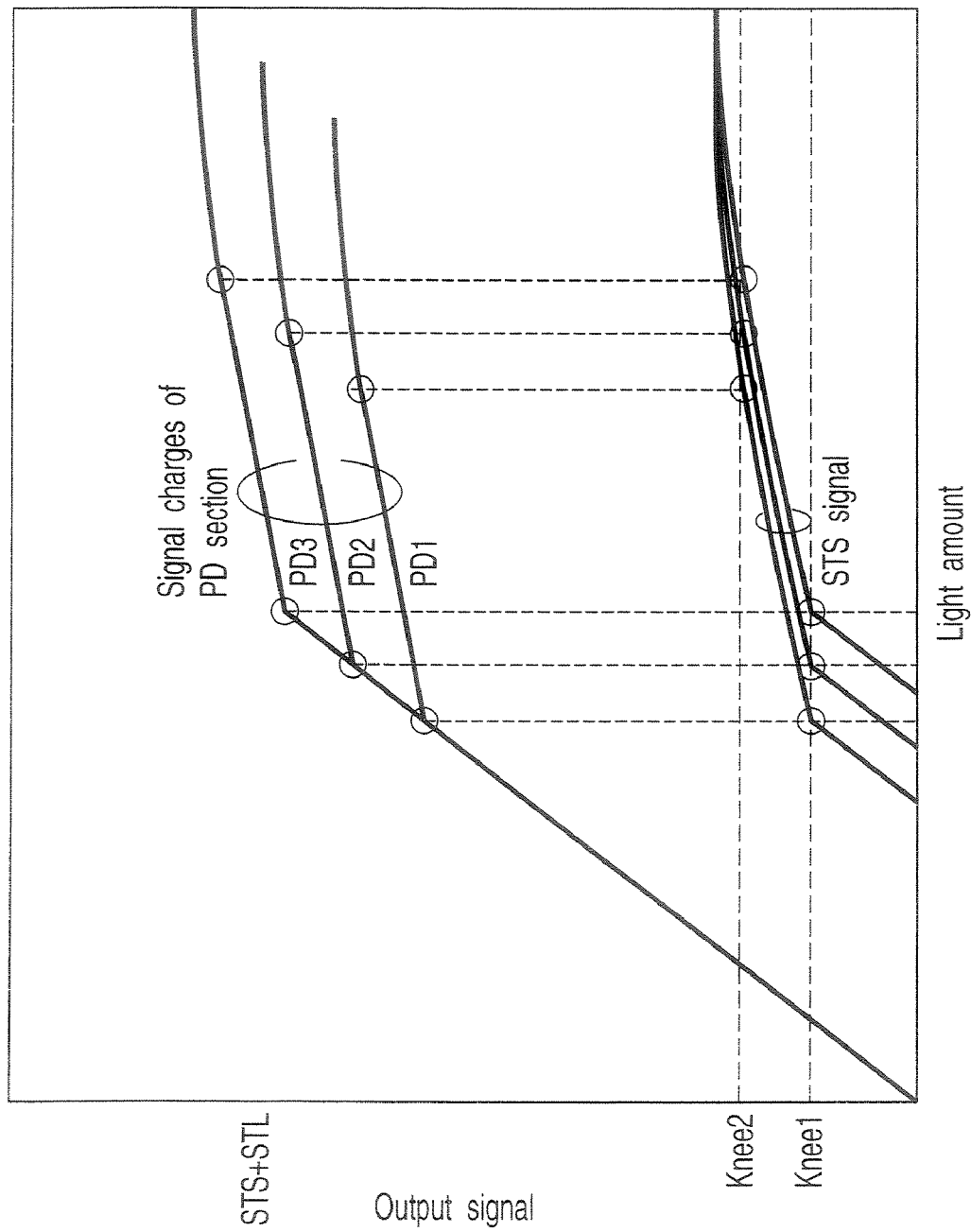
FIG. 13 is a photoelectric conversion characteristic diagram for illustrating the effect of the solid-state image sensing device according to the fourth embodiment of this invention.

As shown in FIG. 13, the characteristic curve of the signal STS in Knee1 and Knee2 can be stably corrected by performing the two-separate reading process with respect to the photodiode PD section. Signal charges accumulated in the photodiode PD section are greatly different in the light amount and generation level at the two Knee points of Knee1 and Knee2 according to a variation in the threshold voltage Vth of the read transistor Td of each pixel (PD1, PD2, PD3). In the present embodiment of this invention, the generation levels of the red signal STS with respect to the light amounts at Knee1 and Knee2 are different for each pixel, but the output levels generated at Knee1 or Knee2 are set equal. Therefore, the gain circuit (GB) or amplifier circuit (GC) used to correct the level of the Knee point can be corrected with high precision. The generation level at the Knee point is almost independent of the operation temperature of the sensor or power supply voltage and Knee1 is largely dependent on the accumulation time ratio TL/TS. The generation level becomes lower and the curve becomes more abrupt as the accumulation time ratio becomes higher.

The difference between Knee1 and Knee2 depends on the difference between read voltages VRDm and VRDL and a curve of the LOG characteristic depends on the photodiodes PD and read gate structure. Therefore, the above information items may be held in the GB parameter 41 or GC parameter 44 to serve the desired purpose.

As described above, in the first to fourth embodiments of this invention, a CMOS sensor with a wide dynamic range can be realized by separately AD-converting and outputting signals of long and short exposure times in one horizontal scanning period in a column ADC type CMOS sensor, amplifying the two read signals by the exposure time ratio TL/TS and selectively subjecting the amplified signals to the linear conversion process.

In the second to fourth embodiments, since the signal of short exposure time has an inclination of photoelectric conversion containing offset and cannot be linearly converted at the switching time, a problem caused by the offset can be solved.

Thus, according to the respective embodiments of this invention, the stable wide dynamic range operation which is difficult to be influenced by the power supply voltage and the operation temperature of the sensor can be performed. Further, in the dynamic range enlarging operation of accumulating signal charges of different exposure times not only in the same photodiode but also in the detecting section or accumulating section (in the case of the sensor having the accumulating section), performing the operation of separately reading the thus accumulated signal charges and synthesizing the signal of short exposure time which has been amplified by the exposure time (accumulation time) ratio with the signal of long exposure time, the color reproducibility of a high-luminance portion can be improved by improving the linearity of the photoelectric conversion characteristic. Further, the deterioration in the color reproducibility due to the characteristic which becomes a curve near the Knee point can be improved.

As described above, according to one aspect of this invention, a solid-state image sensing device which can enlarge the dynamic range without lowering the image quality can be attained.

In the first to fourth embodiments, a case wherein the amplification-type CMOS image sensor is used as the solid-state image sensing device is explained as an example, but this invention can, of course, be applied to another solid-state image sensing device.

Further, a case wherein each cell (pixel) is configured by four transistors (Ta, Tb, Tc, Td) and a photodiode (PD) is explained as an example, but this invention can be applied to various other configurations. For example, this invention can be applied to the configuration in which each cell is configured by three transistors (Tb, Tc, Td) and a photodiode (PD). In the case of the above cell configuration, the row selection transistor Ta in FIGS. 1 and 2 is omitted and the current path of the amplifying transistor Tb is connected between the power supply VDD and the vertical signal line VLIN. The other configuration is the same as that of FIGS. 1 and 2. Each cell is supplied with the pulse signals RESETn and READn.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A solid-state image sensing device comprising:
   a pixel section having cells arranged in a two-dimensional form of rows and columns on a semiconductor substrate, each of the cells including photoelectric converting means for converting an optical signal into an electrical signal, reading means for reading signal charges obtained by photoelectrically converting incident light by use of the photoelectric converting means and supplying the thus read signal charges to a detecting section, amplifying means for amplifying and outputting voltage corresponding to the signal charges accumulated in the detecting section and reset means for resetting the signal charges of the detecting section, an AD converting circuit configured to convert an analog signal output from the pixel section into a digital signal and output the thus converted digital signal, a line memory configured to store the digital signal output from the AD converting circuit, a control circuit configured to control the pixel section and AD converting circuit, subject a plurality of analog signals of different exposure times to AD conversion by use of the AD converting circuit and transfer the AD-converted signals to the line memory in a charge accumulation time period of one frame, and a synthesizing circuit configured to be supplied with a plurality of digital signals of different exposure times from the line memory, compare a first signal obtained by adding signals of short and long exposure times with a second signal obtained by amplifying the signal of short exposure time by a ratio of the signal of the short exposure time to the signal of long exposure time, select a larger one of the compared signals and output the selected signal.

2. The solid-state image sensing device according to claim 1, wherein the synthesizing circuit includes an amplifier circuit configured to amplify part of a signal of short exposure time for emphasis before adding the signals of short and long exposure times.

3. The solid-state image sensing device according to claim 1, wherein the synthesizing circuit further includes an inverse logarithm amplifier circuit configured to amplify the read signals of short and long exposure times by use of an inverse logarithm value of the exposure time and add the amplification results.

4. The solid-state image sensing device according to claim 1, further comprising a pulse amplitude control circuit configured to output voltage of a intermediate level to set the reading means into an open state and discharge signal charges into the detecting section of the pixel.

5. The solid-state image sensing device according to claim 1, wherein the photoelectric converting means is a photodiode whose anode is grounded.

6. The solid-state image sensing device according to claim 1, wherein the reading means is a read transistor whose current path is connected at one end to a cathode of the photodiode and connected at the other end to the detecting section and whose gate is supplied with a read pulse.

7. The solid-state image sensing device according to claim 1, wherein the amplifying means is an amplifying transistor whose gate is connected to the detecting section and whose current path is connected at one end to a vertical signal line.

8. The solid-state image sensing device according to claim 1, wherein the reset means is a reset transistor whose current path is connected at one end to a power supply and connected at the other end to the detecting section and whose gate is supplied with a reset pulse.

9. A solid-state image sensing device comprising:

a pixel section having cells arranged in a two-dimensional form of rows and columns on a semiconductor substrate, an AD converting circuit configured to convert an analog signal output from the pixel section into a digital signal and output the thus converted digital signal, a line memory configured to store the digital signal output from the AD converting circuit, a control circuit configured to control the pixel section and AD converting circuit, subject a plurality of analog signals of different exposure times to AD conversion by use of the AD converting circuit and transfer the AD-converted signals to the line memory in a charge accumulation time period of one frame, and a wide dynamic range mixing circuit configured to be supplied with a plurality of digital signals of different exposure times from the line memory, compare a first signal obtained by adding signals of short and long exposure times with a second signal obtained by amplifying the signal of short exposure time by a ratio of the signal of the short exposure time to the signal of long exposure time, select a larger one of the compared signals and output the selected signal.

10. The solid-state image sensing device according to claim 9, wherein the wide dynamic range mixing circuit includes an amplifier circuit configured to amplify part of a signal of short exposure time for emphasis before adding the signals of short and long exposure times.

11. The solid-state image sensing device according to claim 9, wherein the wide dynamic range mixing circuit includes an inverse logarithm amplifier circuit configured to amplify the read signals of short and long exposure times by use of an inverse logarithm value of the exposure time and add the amplification results.

12. The solid-state image sensing device according to claim 9, wherein the wide dynamic range mixing circuit includes a first subtracter circuit configured to subtract a preset lower bit of a black level from a signal of short exposure time stored in the line memory, a second subtracter circuit configured to subtract a preset lower bit of a black level from a signal of long exposure time stored in the line memory, a gain circuit configured to amplify an output of the first subtracter circuit with a gain corresponding to the ratio of the signal of long exposure time to the signal of short exposure time, an adder circuit configured to add an output signal of the gain circuit and an output signal of the second subtracter circuit, a switch provided between the gain circuit and the adder circuit, a determination circuit configured to turn ON the switch when a signal starts to be output from the first subtracter circuit, a white balance processing circuit configured to perform a white balance process for a signal output from the adder circuit to set R, G and B signals to the same level, and a compression circuit configured to compress and output an output signal of the white balance processing circuit.

13. The solid-state image sensing device according to claim 11, wherein the wide dynamic range mixing circuit includes a first subtracter circuit configured to subtract a preset lower bit of a black level from a signal of short exposure time stored in the line memory, a second subtracter circuit configured to subtract a preset lower bit of a black level from a signal of long exposure time stored in the line memory, an adder circuit configured to add output signals of the first and second subtracter circuits, a first switch provided between the second subtracter circuit and the adder circuit, a first determination circuit configured to turn ON the first switch when a signal starts to be output from the second subtracter circuit, an amplifier circuit configured to amplify an output of the second subtracter circuit by a gain corresponding to the ratio of the signal of long exposure time to the signal of short exposure time, a white balance processing circuit configured to perform a white balance process to set R, G and B signals to the same level, a second switch which selectively connects one of the amplifier circuit and adder circuit to the white balance processing circuit, a second determination circuit configured to control the second switch when determining that a time period of the sum of the signals of long and short exposure times exceeds an accumulation time ratio multiplied by the gain, and a compression circuit configured to compress and output an output signal of the white balance processing circuit.

14. The solid-state image sensing device according to claim 9, wherein the cell includes a photoelectric converter which converts an optical signal into an electrical signal, a reading circuit configured to read signal charges obtained by photoelectrically converting incident light by the photoelectric converter and supplying the read signal charges to a detecting section, an amplifier configured to amplify and output voltage corresponding to the signal charges accumulated in the detecting section, and a reset circuit configured to reset the signal charges of the detecting section.

15. The solid-state image sensing device according to claim 14, further comprising a pulse amplitude control circuit configured to output voltage of a intermediate level to set the reading circuit into an open state and discharge signal charges into the detecting section of the pixel.

16. The solid-state image sensing device according to claim 14, wherein the photoelectric converter is a photodiode whose anode is grounded, the reading circuit is a read transistor whose current path is connected at one end to a cathode of the photodiode and connected at the other end to the detecting section and whose gate is supplied with a read pulse, the amplifier is an amplifying transistor whose gate is connected to the detecting section and whose current path is connected at one end to a vertical signal line, and the reset circuit is a reset transistor whose current path is connected at one end to a power supply and connected at the other end to the detecting section and whose gate is supplied with a reset pulse.

17. The solid-state image sensing device according to claim 9, wherein the cell includes photoelectric converting means for converting an optical signal into an electrical signal, a reading circuit configured to read signal charges obtained by photoelectrically converting incident light by the photoelectric converting means and supplying the read signal charges to a detecting section, an amplifier configured to amplify and output voltage corresponding to the signal charges accumulated in the detecting section, a row selection circuit configured to select a row, and a reset circuit configured to reset the signal charges of the detecting section.

18. The solid-state image sensing device according to claim 17, further comprising a pulse amplitude control circuit configured to output voltage of a intermediate level to set the reading circuit into an open state and discharge signal charges into the detecting section of the pixel.

19. The solid-state image sensing device according to claim 17, wherein the photoelectric converter is a photodiode whose anode is grounded, the reading circuit is a read transistor whose current path is connected at one end to a cathode of the photodiode and connected at the other end to the detecting section and whose gate is supplied with a read pulse, the amplifier is an amplifying transistor whose gate is connected to the detecting section and whose current path is connected at one end to a vertical signal line, the row selection circuit is a row section transistor whose current path is connected at one end to a power supply and connected at the other end to the other end of the current path of the amplifying transistor and whose gate is supplied with an address pulse, and the reset circuit is a reset transistor whose current path is connected at one end to a power supply and connected at the other end to the detecting section and whose gate is supplied with a reset pulse.

* * * * *